United States Patent

Swanson et al.

[11] Patent Number: 6,148,507
[45] Date of Patent: Nov. 21, 2000

[54] MACHINE FOR PRESSING A FASTENER THROUGH SHEET METAL STUDS

[76] Inventors: Jeffery S Swanson, 3411 Harpers Ferry Dr.; Eric S Swanson, 7100 Shoreline Dr., #106, both of Stockton, Calif. 95219

[21] Appl. No.: 09/267,842

[22] Filed: Mar. 12, 1999

[51] Int. Cl.[7] .................................................. B23Q 7/10
[52] U.S. Cl. .......................... 29/816; 29/243.53; 29/276; 29/525.03; 29/798; 29/811.2
[58] Field of Search ................. 29/432.2, 708, 29/798, 716, 816, 525.02, 525.03, 811.2, 276, 243.53

[56] References Cited

U.S. PATENT DOCUMENTS

| Re. 31,737 | 11/1984 | Hafner | 29/432.2 |
|---|---|---|---|
| Re. 35,619 | 10/1997 | Muller | 29/716 |
| 2,911,645 | 11/1959 | Crossen | 29/798 |
| 3,971,116 | 7/1976 | Goodsmith et al. | 29/208 D |
| 4,365,401 | 12/1982 | Ogren | 29/243.53 |
| 4,403,409 | 9/1983 | Richards | 29/716 |
| 4,505,416 | 3/1985 | Smallegan | 227/120 |
| 4,507,991 | 4/1985 | Lemke | 81/463 |
| 4,625,903 | 12/1986 | Becht | 227/131 |
| 4,705,201 | 11/1987 | Bennett | 227/55 |
| 4,765,057 | 8/1988 | Muller | 29/716 |
| 4,765,175 | 8/1988 | Denham et al. | 72/391 |
| 4,878,284 | 11/1989 | Sawdon | 29/243.53 |
| 5,104,024 | 4/1992 | Brewer et al. | 227/2 |
| 5,144,870 | 9/1992 | Nick | 81/434 |
| 5,207,085 | 5/1993 | Hopkins et al. | 72/391.6 |
| 5,398,537 | 3/1995 | Michalewski et al. | 72/430 |
| 5,469,610 | 11/1995 | Courian et al. | 29/243.521 |
| 5,502,884 | 4/1996 | Ladouceur | 29/407.05 |
| 5,657,536 | 8/1997 | Shinjo | 29/798 |
| 5,778,516 | 7/1998 | Dear et al. | 29/707 |
| 5,953,813 | 9/1999 | Sickels et al. | 29/798 |

*Primary Examiner*—David P. Bryant
*Assistant Examiner*—Essama Omgba

[57] ABSTRACT

A machine for pressing a fastener through sheet metal with a magazine for holding a strip of fasteners that self load semi-automatic, a clamp for loading the fastener, and holding material to be fastened, a fastener barrel guide to establish proper position of the fastener to be installed, a first stage low power source to provide pressure for loading the fastener and clamping the material, a second stage high power source for installing and securing the fastener, a lock seat set opposed to the clamp, to hold the opposite side of the material and the second part of the fastener component. A preferred embodiment includes a lock seat for holding the second part of the fastener. A preferred embodiment includes a removable lock seat, so that the tool will have the ability to use different type lock-seats, therefore allowing the same tool the capability of installing different type fasteners.

6 Claims, 9 Drawing Sheets

MACHINE FOR PRESSING A FASTENER THROUGH SHEET METAL STUDS

BACKGROUND OF THE INVENTION

This invention relates generally to the field of fasteners, and more particularly to a machine for pressing a fastener through sheet metal and sheet metal studs.

The most common way today to fasten sheet type metals, or other sheet materials, is basically several. First is by using screws that are drilled in to the material, second to either weld or spot weld the material if it is ferrous, and thirdly to predrill or punch the material to be fastened then to install some type of rivet.

First for the punching method, hydraulic systems have been used in a variety of machines for the purpose of punching, with relatively little effort required on behalf the operator. Pneumatic systems have been employed also for accomplishing the same task, but provide less energy for the task.

Even though there have been prior machines that have been put to use for fastening sheet type materials, they are intended for use in a shop type environment, and due to their size and weight can not be used in the field, as opposed to the intention of this tools design, to be a light weight combine punching and fastening in one operation, and be a user friendly tool for in the field use.

The second and most common way of fastening sheet materials such as steel studs has been with the use of electric drills and screws, due to the relative mobility and versatility of the available equipment. However the disadvantages this method are as follows: this method needs the craftsman to be well coordinated just to maintain control of the screw being used during the installation; the process of installing the fastener is far more time consuming and therefore less efficient than this new method; finally this method does not provide as positive a connection due to stripping, over tightening, and vibration which can loosen the screw type fastener.

The third method involves the process of welding which is also more time consuming than this new method due to the material needing to be treated afterwards for corrosion protection, and also the need of welding procedure specification (WPS), Quality Control Plans (QCP) and ever increasing inspection requirements.

This new type of fastener is simple to use due to the fact that the tool handles the responsibility of aligning the fastener and contains the work force needed to install the fastener within the tool itself, thus reliving the installer of much of the work load required by present technology. Also the tool installs a fastener that is on both sides of the material providing a greater mechanical connection, rather than simply relying on the integrity of the thread connection.

SUMMARY OF THE INVENTION

The primary object of the invention is to provide the worker a tool for fastening metal studs in an efficient manner.

Another object of the invention is to provide an easier means of fastening sheet metal pieces.

Another object of the invention is to provide a faster means of fastening two or more material pieces.

A further object of the invention is to provide an improved method of connection of sheet metal studs.

Yet another object of the invention is to provide a self feeding strip of fasteners for operation efficiency.

Still yet another object of the invention is to provide a tool platform for multiple fastener types with one tool.

Other objects and advantages of the present invention will become apparent from the following descriptions, taken in connection with the accompanying drawings, wherein, by way of illustration and example, an embodiment of the present invention is disclosed.

A machine for pressing a fastener through sheet metal studs comprising: a magazine for holding a strip of fasteners that self load semi-automatic, a clamp for loading the fastener, and holding material to be fastened, a fastener barrel guide to establish proper position of the fastener to be installed, a first stage low power source to provide pressure for loading the fastener and clamping the material, a second stage high power source for installing and securing the fastener, a lock seat set opposed to the clamp, to hold the opposite side of the material and the second part of the fastener component during operation.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Mechanical Aspects

Figure 1:
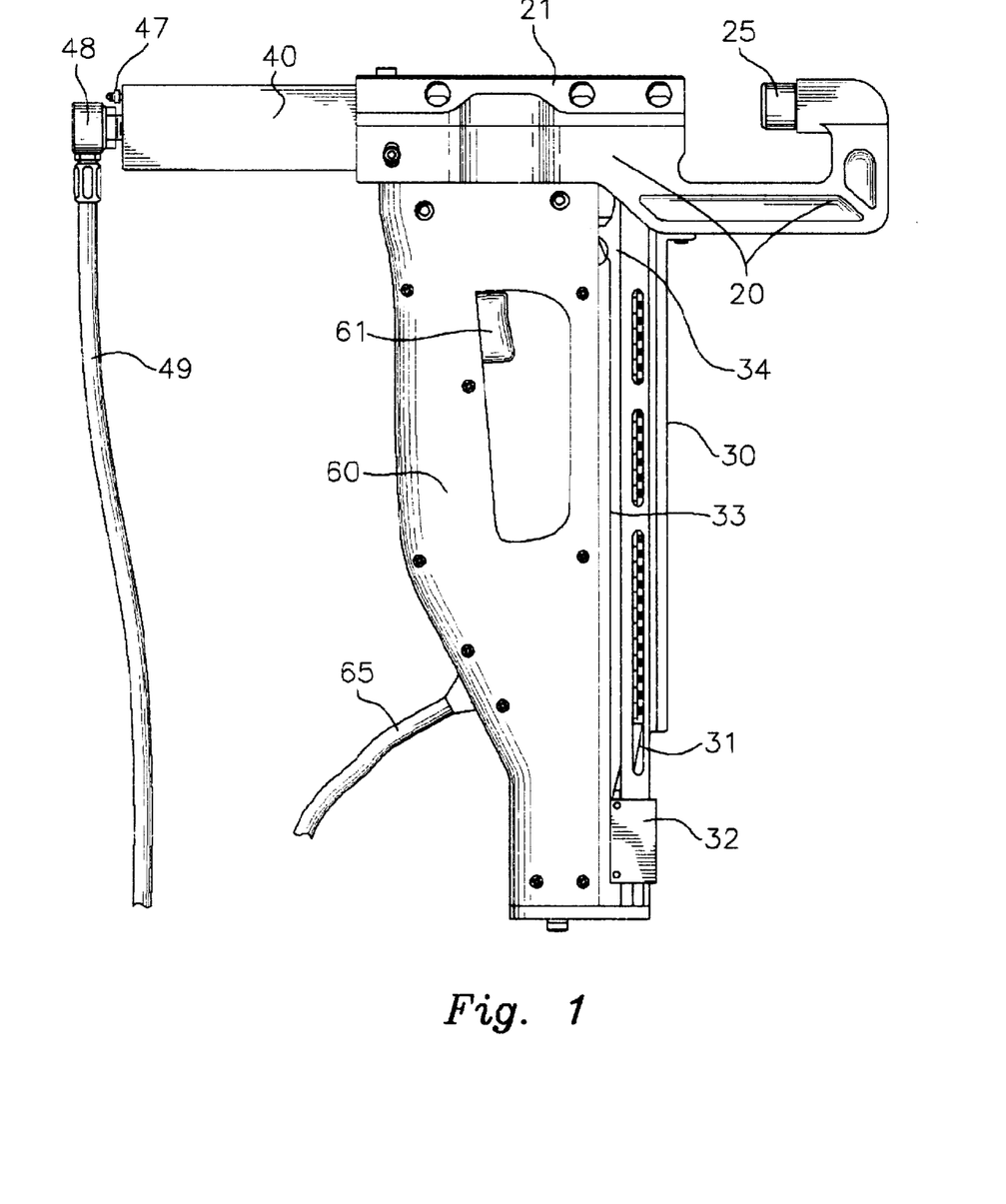
FIG. 1 is a side view of the invention showing the hydraulic and control cord connections.

Turning first to FIG. 1, there is shown a side elevation view of the portable Fastener Tool. The tool handle 60 provides the means for holding the tool which houses the switch 61 for operating the tool. The electrical control cord 65 provides the operational control connection between the tool and the control solenoids in the pneumatic/hydraulic power unit not shown. The magazine fastener slide 30 holds a strip of preassembled fasteners which are pushed by the fastener pusher 32, the connection between the fasteners and the fastener pusher 32 is made by an articulating pusher arm 31 connected to the fastener pusher 32. The spring tape 33 and spring tape assembly provides the force needed to move the fastener pusher 32 thus providing the means to load the fastener into the barrel clamp 22 not shown inside the tool. The tool frame 20 provides the base for the connection of the various components and also the means necessary for holding the second part of the fastener. The fastener lock (not shown) is temporarily held in place by the rubber lock clip 25. A frame cap 21 covers the interior components and also serves as one of the connection points for the hydraulic cylinder, this frame cap is also chamfered to allow the tool to fit into confined spaces. The hydraulic hose is the power supply connection between the tool and pneumatic/hydraulic power unit (not shown), the hydraulic hose is connected to the tool by means of a swivel connecter 48, and air can be purged from the system by means of the bleeder valve 47, these are both connected to the hydraulic cylinder 40.

Figure 2:
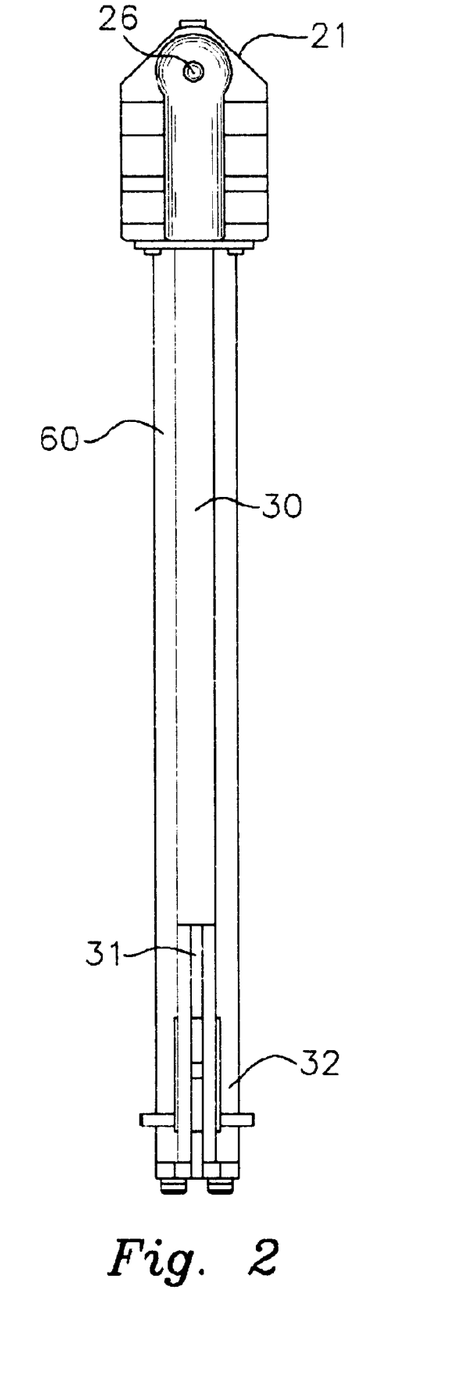
FIG. 2 is a front view of the invention.

The view shown in FIG. 2, looks at the tool from the front, during operation the slug of material being fastened is expelled through the ejection hole 26. The fastener slide 30 is positioned on the center line of the tool, this view also reveals the opening at the bottom of the fastener slide, where the fastener strip (not shown), is loaded into the slide. The fastener push 32 finger handles protruding perpendicular from both sides which are used for the reloading operation, can also be seen from this view. Also the chamfered shape of the frame cap 21 can be seen from this end view.

Figure 3:
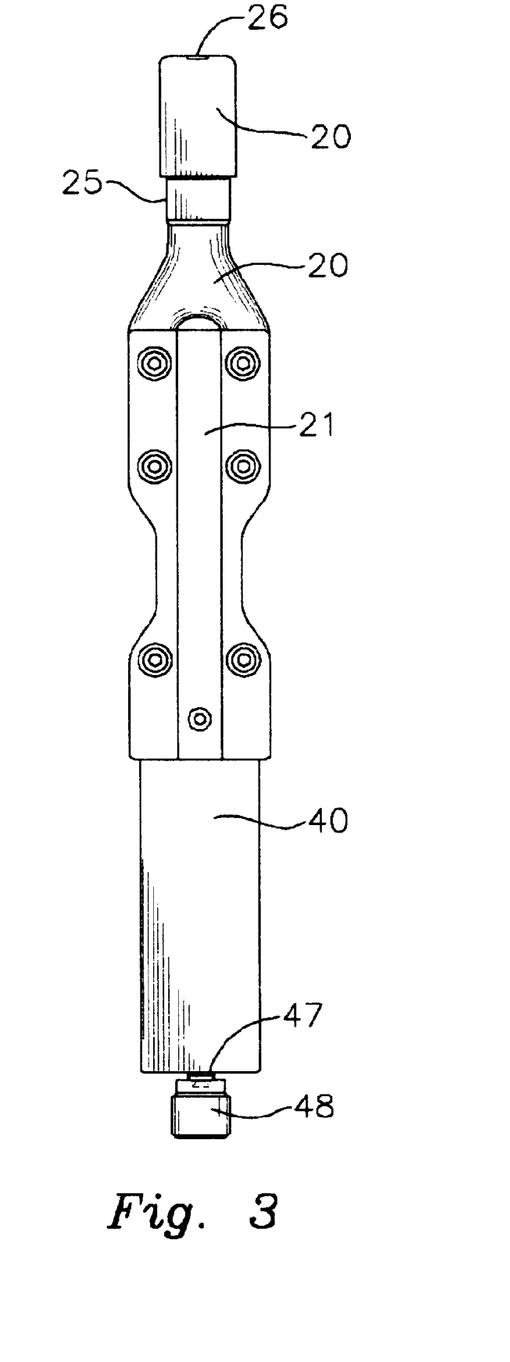
FIG. 3 is a top view of the invention.

The top view shown in FIG. 3, shows how the arm section of the frame splits as it nears the section covered by the frame cap 21 to allow for an entrance opening for the fasteners to be loaded into the tool by means of the fastener slide 30 not shown due to being on the under side of this view.

Figure 4:
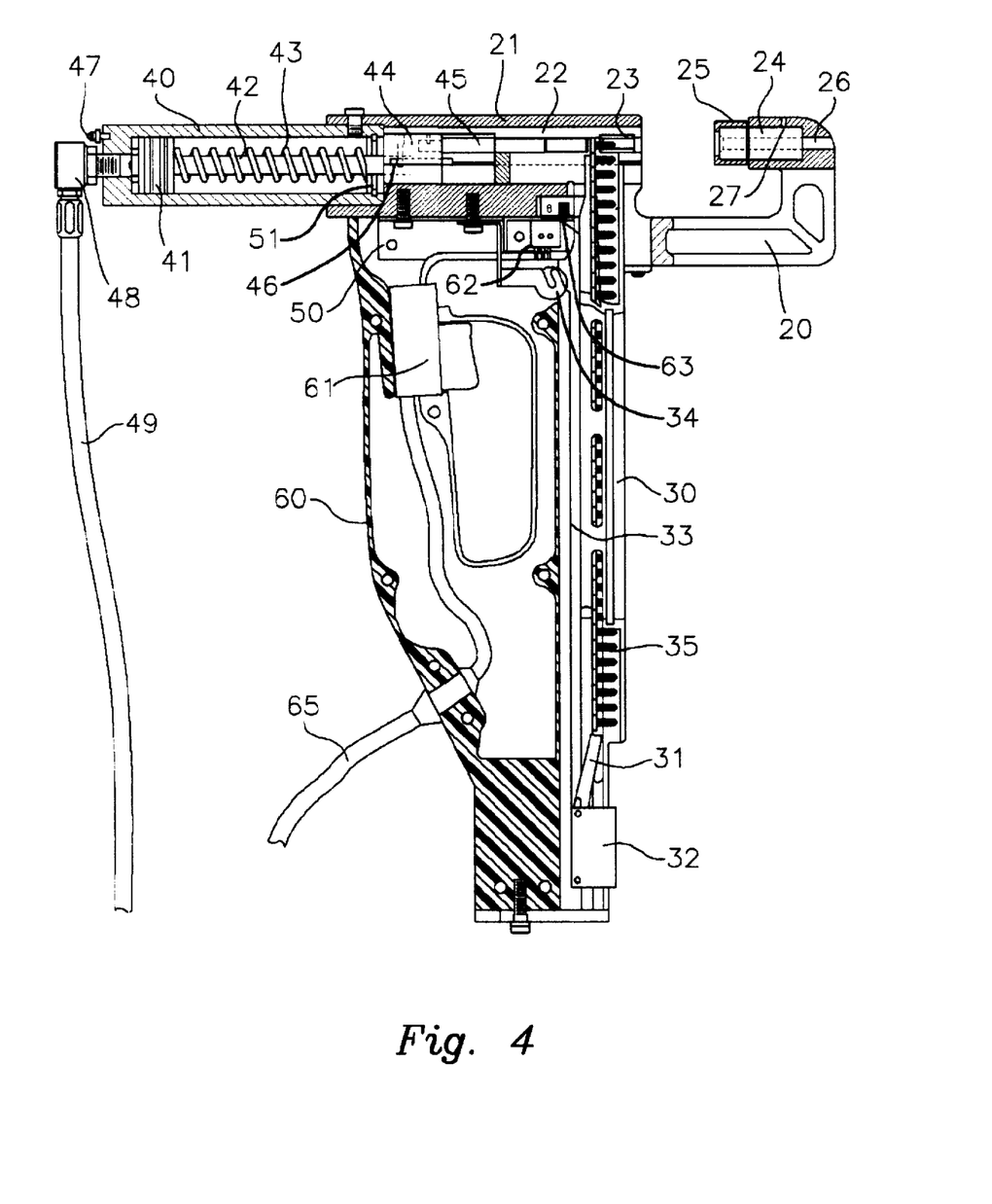
FIG. 4 is a cross sectional start position view of the invention.
Figure 6:
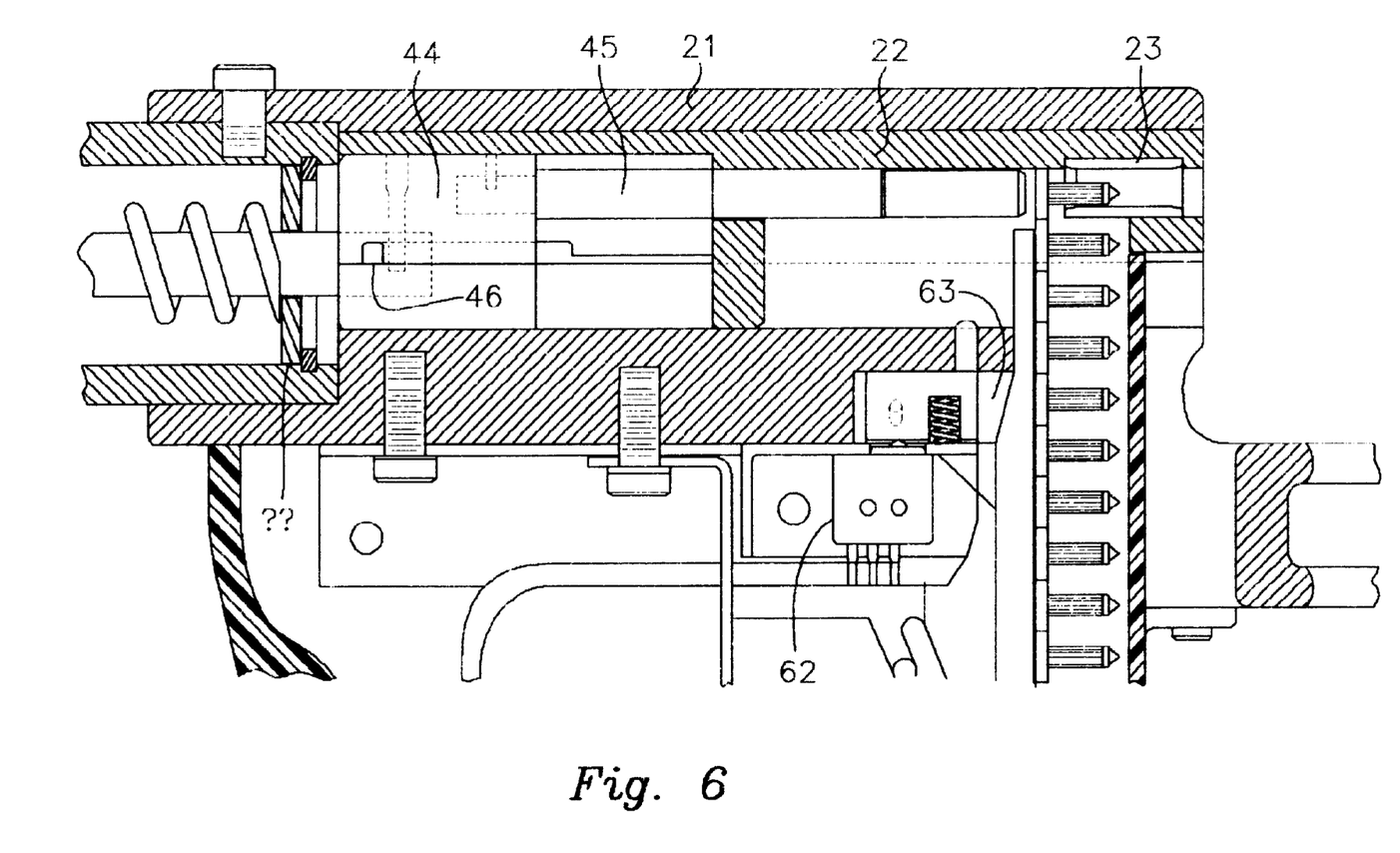
FIG. 6 is a cross sectional enlarged view of the start position view of the invention for clarity.

The next view shown in FIG. 4, reveals the start position of the tool with a full load of fasteners, and with one fastener loaded in the chamber. The barrel clamp 22 is in the fully retracted position along with the press pin 45 which allows for the automatic load of one fastener into the barrel clamp. To start the operation of installing a fastener the operator places one fastener lock not shown, onto the fastener lock set 24 which is then held in place temporarily by the lock clip 25. Next the operator places the tool with the lock clip against one side of the material which is to be fastened. Next the operator presses the start switch 61 which sends a signal back to the pneumatic/hydraulic power unit (not shown), through the electrical control cord 65. This action sends a low pressure hydraulic circuit back to the tool through the hydraulic hose 49 and the swivel connector 48 into the hydraulic cylinder 40, this force is then exerted against the hydraulic piston 41, and then this force is then transferred to the piston shaft across to the piston arm 44, which transfers the force over to the offset yet parallel press pin 45 FIG. 6. Next the press pin is moved against the head of the loaded fastener breaking the fastener away from it's strip and fastener slide 30, into the alignment sleeve 23 which provides contact to the outer edge of the fastener head thus providing alignment. Back to FIG. 4. This action also provides movement of the barrel clamp 22 against the other side of the material being fastened. During this operation two scenarios may take place. The first operation is if the barrel clamp 22 is prevented from closing against the material being fastened by an obstruction, which in turn will prevent the second high pressure switch 62 from being closed, and thus preventing the tool from being energized with high pressure hydraulics. This is to provide a safety for the operator against injury during operation. The second operation is if the barrel clamp 22 is not obstructed and thus is permitted to travel over the spring loaded position pin 63 moving it down onto the high pressure switch, this will turn on the high pressure switch which will activate the high pressure hydraulic circuit back to the tool in the same way as described for the low pressure circuit, thus providing the power necessary to punch and fasten the material in one motion. During the fastening operation the slug from the material being punched is ejected through the slug opening 26.

Figure 5:
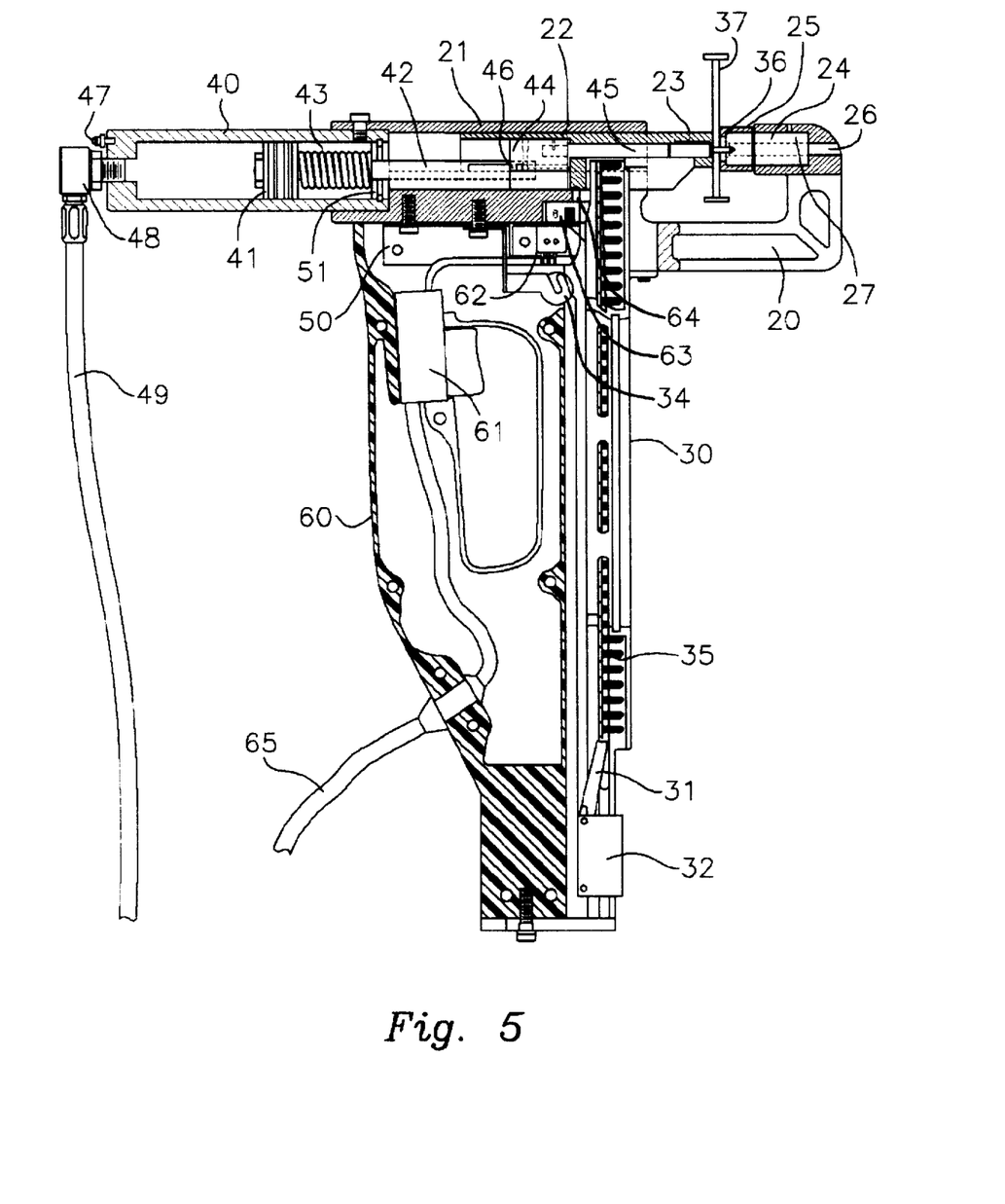
FIG. 5 is a cross sectional run position view of the invention.
Figure 7:
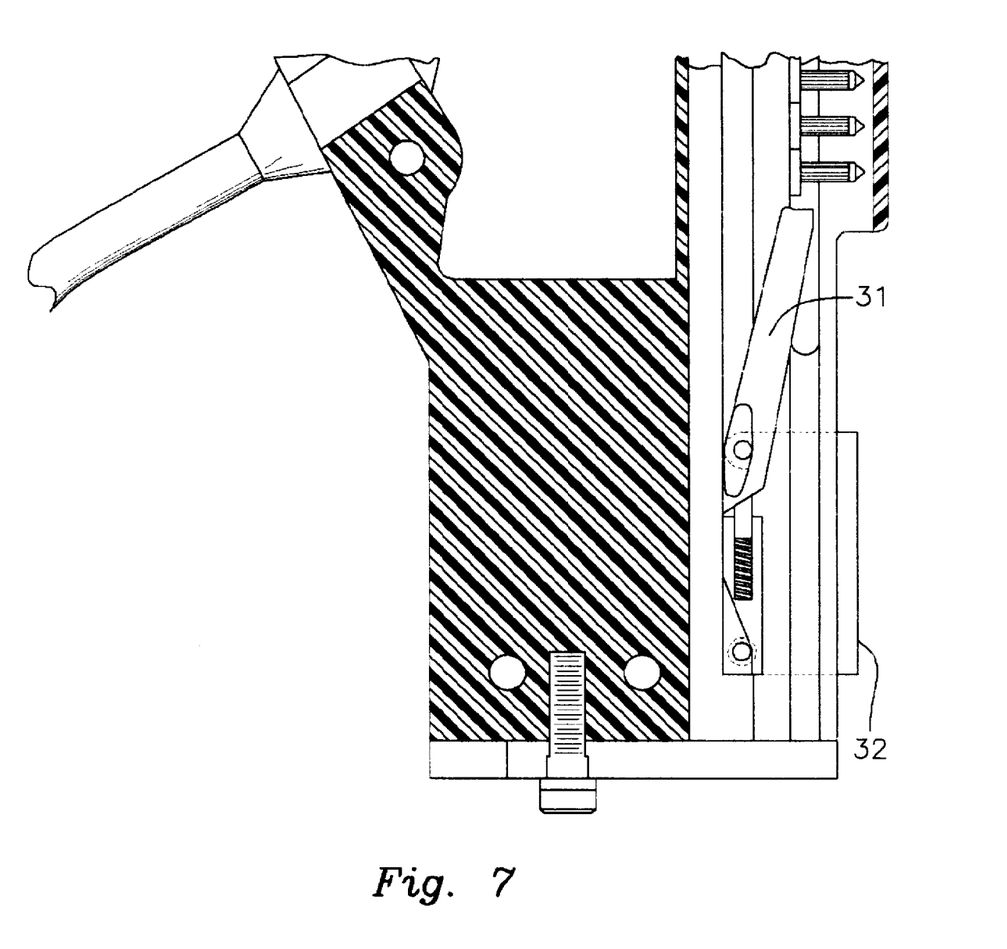
FIG. 7 is an cross sectional view of the magazine fastener slide.

The next view shown in FIG. 5, shows the material 37 fastened by the fastener and fastener lock represented by 36. At this point of the operation the hydraulic system will be de-energized back at the pneumatic/hydraulic power unit by means of a pressure switch 826 FIG. 8, this will cause the piston 41 to retract to its start position by means of the force exerted against the opposite side by the piston spring 43, which is held in place and pressed against the retaining ring and plate 51. This movement in turn also draws back the piston rod 42, piston rod arm 44, and press pin 45. During this movement as the piston rod arm is being drawn back the piston rod arm key 46 also draws back barrel clamp 22 due to the key way opening in the barrel clamp. This causes all the internal components to return to the start position, also allowing the next fastener to enter the barrel clamp 22 as shown in FIG. 4. The other components shown in FIG. 5, are as follows the lock seat 24 is removable by loosening its set screw 27 thus allowing the lock seat to be changed for the use of alternate fasteners. The components used for automatic fastener loading are the fastener slide 30 which hold the fastener strip, the spring tape assembly 34, the spring tape for providing pulling force to the fastener push 32 FIG. 7, and a means of transferring that force from the fastener push to the fastener strip by means of an articulating pusher arm 31.

Pneumatic/Hydraulic Circuits and Operation

Figure 8:
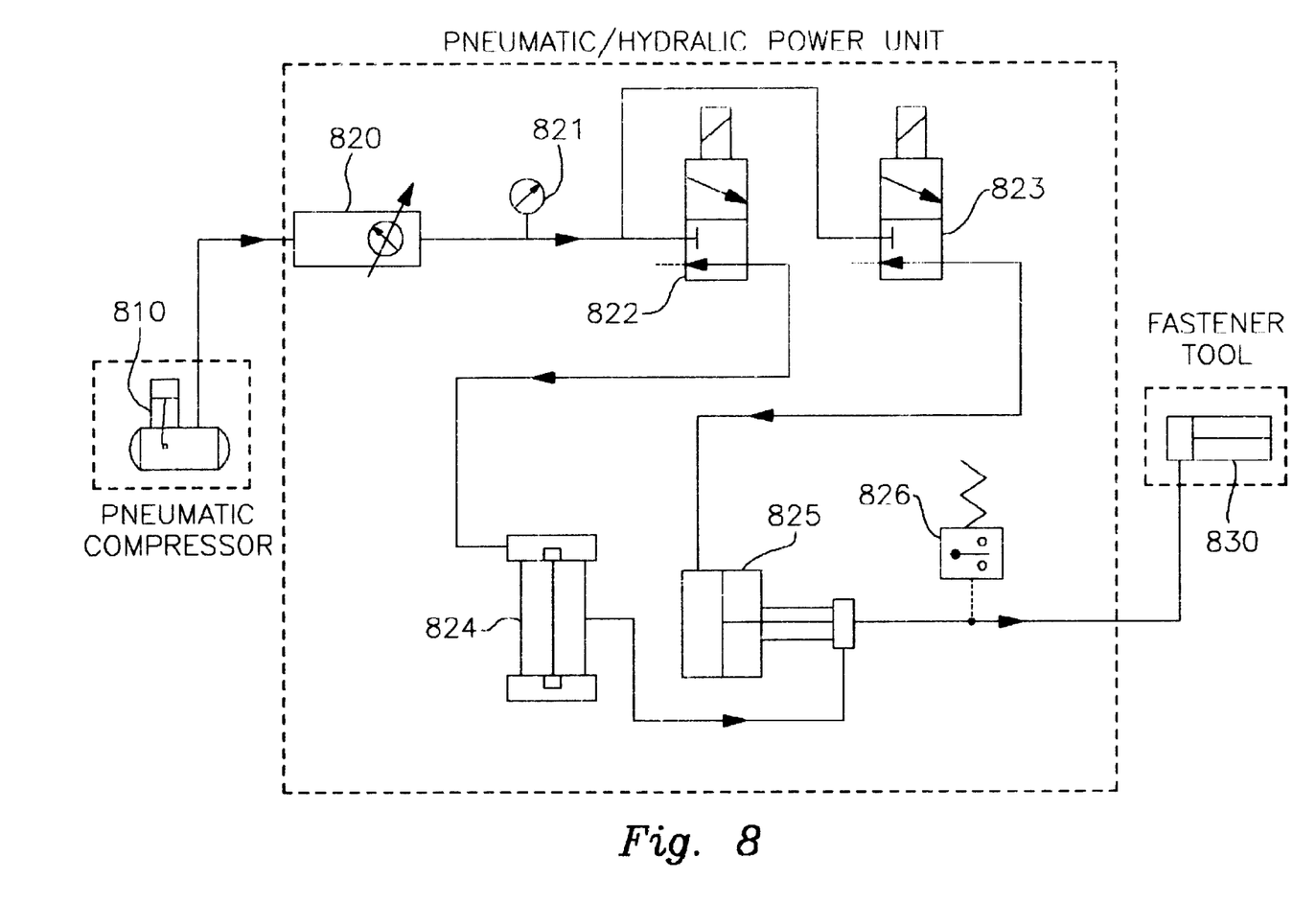
FIG. 8 is an pneumatic/hydraulic schematic of a circuit embodied in the invention.

FIG. 8, presents a schematic representation of the pneumatic/hydraulic system 800 of the preferred tool fastener system. In general, the preferred system 800 includes an air compressor power supply 810 which is connected to the pneumatic/hydraulic unit, the pressurized air enters the unit first through the pneumatic filter, oil, regulator 820 through which adjustments can be made to achieve the desired air pressure by the operator, air pressure is then displayed by an air pressure gauge 821.

Control of the pneumatic/hydraulic unit during operation is initiated by the start switch 61 at the tool handle which closes the normally open contact at the switch thus closing and energizing the electrical circuit back through the control cord 65, to the 3-way directional valve solenoid 822 opening the air circuit to the air/oil tank 824 this converts the pneumatic energy into equal hydraulic energy, the hydraulic fluid then moves through the circuit entering then exiting the hydraulic intensifier 825, remaining at the same pressure, then enters the hydraulic hose 49. The hydraulic fluid now enters the hydraulic cylinder 40 at the tool 830, this moves the tool components 42, 43, 44, 45, 22, 23, and one loaded fastener 35 into position for the high pressure sequence as described previously, if the barrel clamp 22 moves into the position causing the spring loaded position pin to close the contacts in the high pressure switch 62, this will cause the circuit to be closed energizing the circuit back at the 3-way directional valve solenoid 823 opening the air circuit to the hydraulic intensifier 825 which now converts the pneumatic pressure into hydraulic pressure and also more importantly multiplies this pressure on the hydraulic side of the circuit. This high pressure hydraulic fluid enters the tool in the same way as was discussed for the low pressure phase but now provides the force needed to punch the material and secure the fastener into it fastener lock on the opposite side of the material held in temporary position by its lock seat 24. After this has taken place and the tool components can no longer move in the tool due to resistance, pressure will then begin to build within the high pressure hydraulic circuit, which will then trip the hydraulic pressure switch 826. Once maximum pressure is reached the hydraulic pressure switch 826 will then completely de-energize the hydraulic system and reset the tool 830 and the pneumatic/hydraulic power unit 800 for the next operation. The electrical schematics of this system will be described in the next section.

Electrical Circuits and Operation

Figure 9:
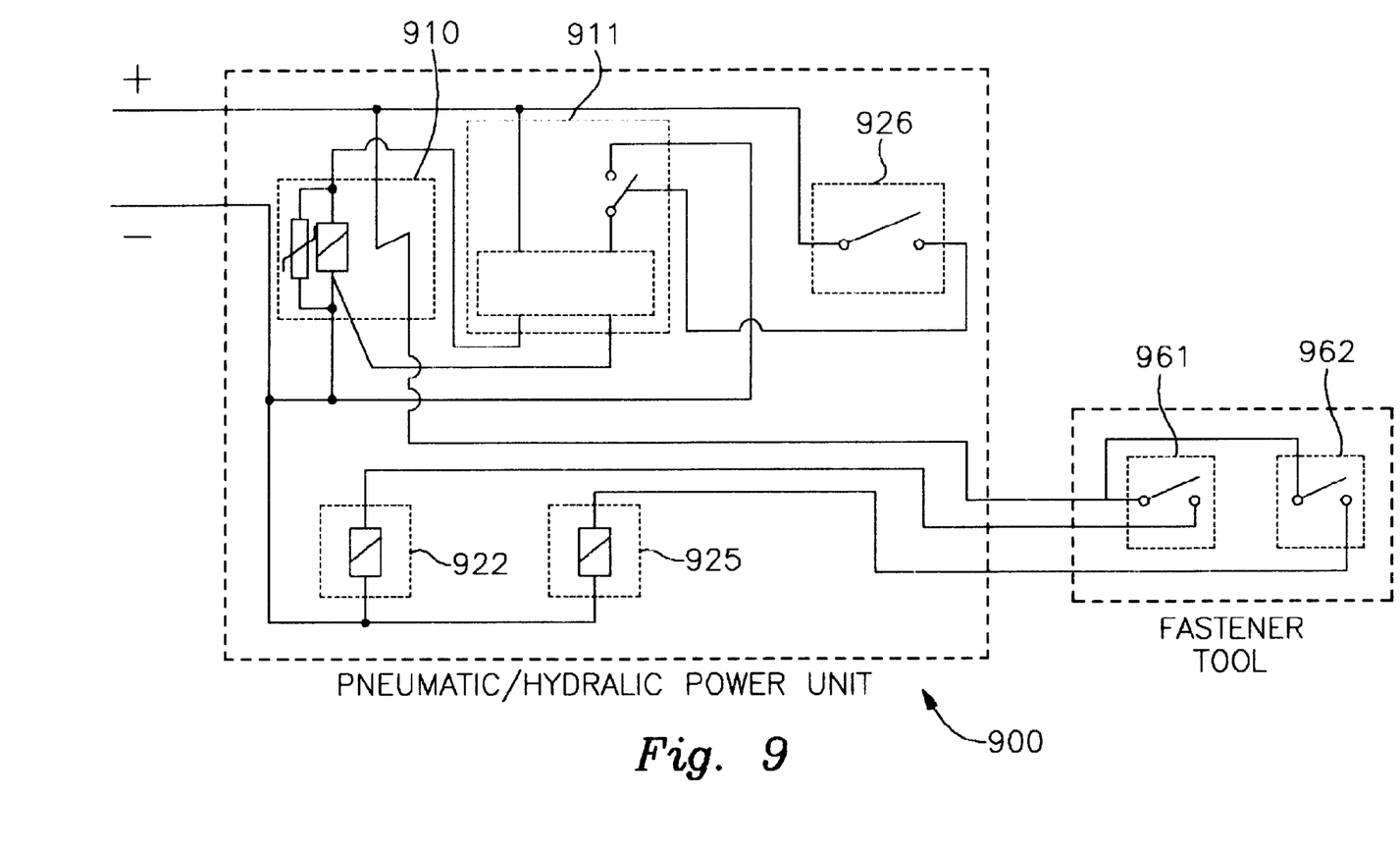
FIG. 9 is an electrical schematic of a circuit embodied in the invention.

FIG. 9 presents a schematic representation of the electrical system 900 of the preferred tool fastener system. In general, this preferred system 900 includes starting with a 1-pole start switch 961 in the tool handle 60. When the operator pushes this button thereby closing the energized circuit back to the pneumatic/hydraulic unit, through the control cord 65, this activates the low pressure solenoid 922 opening the 3-way directional valve 822. The next operation is started when the 1-pole, high pressure switch 962, is closed thereby energizing the circuit back to the pneumatic/hydraulic unit, also through the same control cord, this activates the high pressure solenoid 923 opening the 3-way directional valve the next operation is started when the contacts in the 1-pole hydraulic pressure switch are closed thereby energizing the electronic timing module 911. The electronic timing control module 911, then energizes the control relay 910 thereby opening the normally closed contact pole thus de-energizing the pressure solenoids and therefore reliving the hydraulic pressure in the system. The control relay 910 remains in this mode thereby allowing the tool to reset itself until the electronic control module 911 returns the normally closed to their normal position after a set time.

Figure 10:
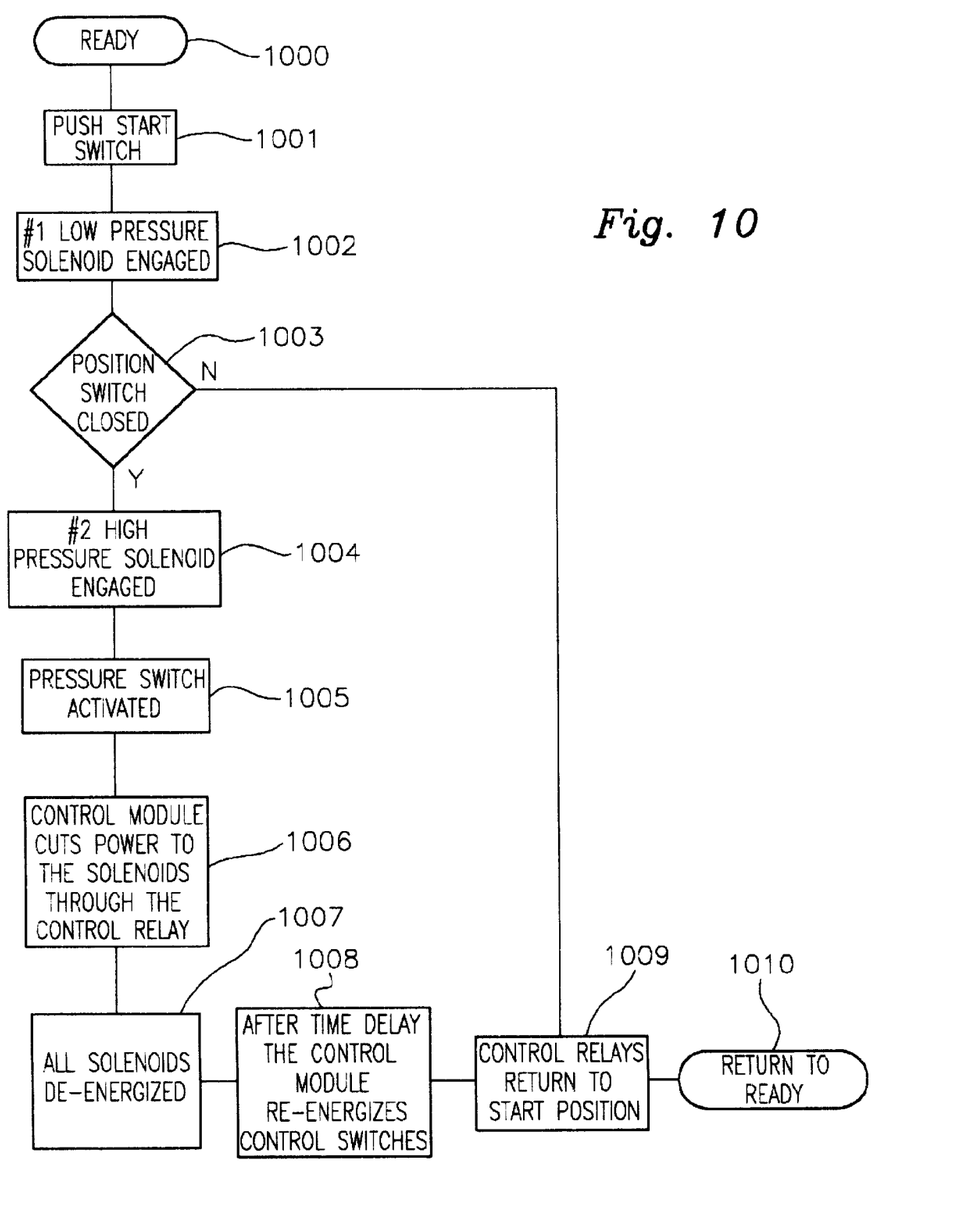
FIG. 10 is a flow chart of the operations that comprise the method.

FIG. 10 presents a logic diagram of the tools fastening operation. In general, this preferred system is operated by pushing the tools start switch 1001, this engages the low pressure solenoid 1002, this in turn causes an action to be made by the tool, is the barrel clamp position switch closed, yes or no 1003? If no move to action 1009. If yes the high pressure solenoid is engaged 1004, the next operation is for the fastener to be installed an subsequently the pressure switch to be activated 1005, this causes the control module to cut the power to the solenoids through the control relay 1006, next all solenoids are de-energized thus reliving hydraulic pressure 1007, the tool now resets itself for the next operation and the switches are re energized for the next operation 1008. Return to ready status 1000.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A portable machine for pressing a two part fastener through material comprising:

a portable tool having a tool frame;

a magazine in said tool for holding a plurality of first fasteners;

a base in said tool frame for holding a mating second lock fastener for engagement with one of said first fasteners;

a barrel clamp for loading and positioning one of said first fasteners and for holding the material to be fastened;

a first stage low power source to provide pressure to said barrel clamp for loading the first fastener and clamping the material;

a lock seat set opposed to the clamp to hold the opposite side of the material and said second fasteners; and a second stage high power source for causing penetration of the material by one of said first fasteners and mating with said lock fastener on the opposite of said material.

2. The portable machine of claim 1 further comprising a remote controlled low and high pressure hydraulic power system for pressing said first and second fasteners.

3. The portable machine of claim 1 wherein said lock seat is removable.

4. The portable machine of claim 1 further comprising a proximity switch to prevent said second stage high power source from activating when the barrel is obstructed.

5. The portable machine of claim 1 further comprising a proximity switch to energize the high pressure power source automatically for installing said fasteners.

6. The portable machine of claim 1 further comprising means for automatically de-energizing the high pressure power source.

* * * * *